(12) United States Patent
Biel

(10) Patent No.: US 7,932,821 B2
(45) Date of Patent: Apr. 26, 2011

(54) NETWORK FOR COMBAT CONTROL OF GROUND-BASED UNITS

(75) Inventor: Kristoffer Biel, Karlskoga (SE)

(73) Assignee: BAE Systems Bofors AB, Karlskoga (SE)

( * ) Notice: Subject to any disclaimer, the term of this patent is extended or adjusted under 35 U.S.C. 154(b) by 470 days.

(21) Appl. No.: 12/064,009

(22) PCT Filed: Aug. 11, 2006

(86) PCT No.: PCT/SE2006/000942
§ 371 (c)(1),
(2), (4) Date: Jun. 16, 2008

(87) PCT Pub. No.: WO2007/021230
PCT Pub. Date: Feb. 22, 2007

(65) Prior Publication Data
US 2008/0246601 A1    Oct. 9, 2008

(30) Foreign Application Priority Data
Aug. 16, 2005 (SE) .................................... 0501812

(51) Int. Cl.
*G08B 1/08* (2006.01)
(52) U.S. Cl. .............. 340/539.11; 340/527; 340/539.1
(58) Field of Classification Search ............ 340/539.11, 340/539.13, 539.14, 539.21, 539.22, 539.26, 340/538.15, 539.1, 527, 571
See application file for complete search history.

(56) References Cited

U.S. PATENT DOCUMENTS

| | | | | |
|---|---|---|---|---|
| 5,487,172 A * | 1/1996 | Hyatt | .............................. | 712/32 |
| 5,955,987 A * | 9/1999 | Murphy et al. | .......... | 342/357.29 |
| 2003/0005030 A1 * | 1/2003 | Sutton et al. | .................. | 709/200 |
| 2004/0030463 A1 | 2/2004 | Stockdale et al. | | |
| 2004/0033472 A1 * | 2/2004 | Varshneya | ........................ | 434/23 |
| 2004/0109059 A1 * | 6/2004 | Kawakita | ........................ | 348/143 |
| 2005/0143013 A1 | 6/2005 | Jha | | |

FOREIGN PATENT DOCUMENTS

| | | |
|---|---|---|
| DE | 19608979 A1 | 9/1997 |
| DE | 19640442 A1 | 4/1998 |
| EP | 1482683 A2 | 12/2004 |

* cited by examiner

*Primary Examiner* — Daniel Previl
(74) *Attorney, Agent, or Firm* — Connolly Bove Lodge & Hutz LLP

(57) ABSTRACT

A network for combat control of ground-based units, such as combat vehicles, in real time, may obtain information is concerning the units comprised in the network for the evaluation of threats and the calculation of a response. The units may be divided into clusters with a central unit in each cluster and at least one client unit in each cluster, which client units are arranged to communicate with the associated central unit. Each unit comprises a control computer, radio, amplifier and antenna for communication with other units. The central unit may control units comprised in an associated cluster on the basis of threat evaluation and response calculation carried out in the central unit on the basis of information communicated from other units and on the basis of information obtained by means of its own equipment.

20 Claims, 3 Drawing Sheets

NETWORK FOR COMBAT CONTROL OF GROUND-BASED UNITS

RELATED APPLICATIONS

This application is a national stage application (under 35 U.S.C. §371) of PCT/SE2006/000942 filed Aug. 11, 2006, which claims benefit of Swedish application 0501812-2 filed. Aug. 16, 2005, disclosure of which is incorporated herein by reference.

The present invention relates to a network for combat control of ground-based units, such as combat vehicles, in real time, in which information is obtained concerning the comprised units for the evaluation of threats and the calculation of a response.

The known classical procedure for fire control is as follows. Firstly, the range of the target is measured and its path is calculated. Thereafter, strike point calculations are carried out in order to be able to attack the target in question. If there are several targets, a threat evaluation is carried out and, if there are several guns, a response calculation is carried out in order to allocate the target to the most suitable gun that is available. The calculations assume that the guns are static. In the cases when the gun platforms are mobile, the above calculations are not sufficient. In this case, information can be required that includes information about the current positions of the gun platforms, their speed and direction of movement. In order to handle this, the introduction of a network is proposed. Networks for fire control are already known and are utilized primarily in association with air-based systems.

The object of the present invention is to achieve a network for combat control that is suitable for a limited number of ground-based units. The network must have a simple construction and must have short delay times.

The object of the invention is achieved by a network characterized in that the units are divided into clusters, with a central unit in each cluster and at least one client unit in each cluster, which client unit is arranged to communicate with the associated central unit, with each unit comprising a control computer, radio, amplifier and antenna for communication with other units, in that the central unit is arranged to control units comprised in an associated cluster on the basis of the threat evaluation and the response calculation carried out in the central unit on the basis of information communicated from other units, comprising information about the current position, speed, orientation and status of the respective units, and on the basis of information obtained by means of its own equipment, such as active and passive sensors. By dividing the ground-based units into clusters and arranging the communication of information in the way described, an effective network for combat control of ground-based units is achieved. The communication between the units is preferably carried out by wireless means.

According to an advantageous embodiment of the invention, the network is characterized in that a clock is arranged in each unit's radio, with the clocks being synchronized with the central unit. The synchronization can be achieved by means of the communication between the central unit and the other units within the associated cluster. Alternatively, the clocks can be synchronized with GPS-time. According to yet another advantageous embodiment of the invention, the network is characterized in that a unit that intends to transmit predicts the delay in the transmission to the other unit. By means of these networks, short delays are achieved that make a considerable contribution to fulfilling the real-time demands that are made of a network according to the invention.

According to another advantageous embodiment, the central unit and the other units in an associated cluster are arranged to communicate bi-directionally and via several channels. The central unit and the other units are advantageously arranged to communicate utilizing frequency hopping. By utilizing frequency hopping and, in particular, by utilizing a high hop rate, the network is made less sensitive to interference.

According to yet another advantageous embodiment, the central unit in a cluster comprises a dedicated gun platform. The introduction of a dedicated gun platform increases the central unit's resources still further as the gun platforms of both the other units and of the central unit are available to the central unit for firepower under the control of the central unit.

The invention will be described below with reference to the attached drawings, in which.

Figure 1:
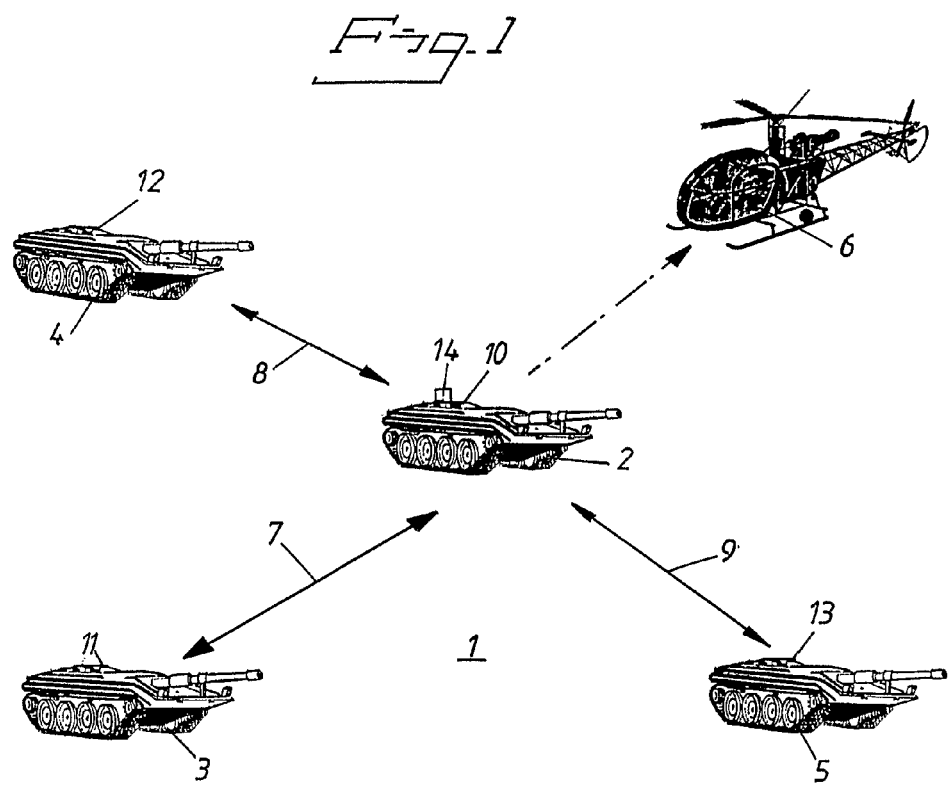
FIG. 1 shows a first example of the communication in a network according to the invention.

In the first example of communication illustrated in FIG. 1, a network 1 comprises four units, a central unit 2 and three client units 3, 4 and 5. In addition, a target 6 is shown, that in this case consists of a helicopter. Solid bi-directional arrows 7, 8 and 9 indicate bi-directional communication between the central unit 2 and the client units 3-5. It can be seen from the figure that all the units are provided with a gun platform with the reference numerals 10, 11, 12 and 13 respectively. In addition, the central unit 2 is provided with sensors 14.

Figure 2:
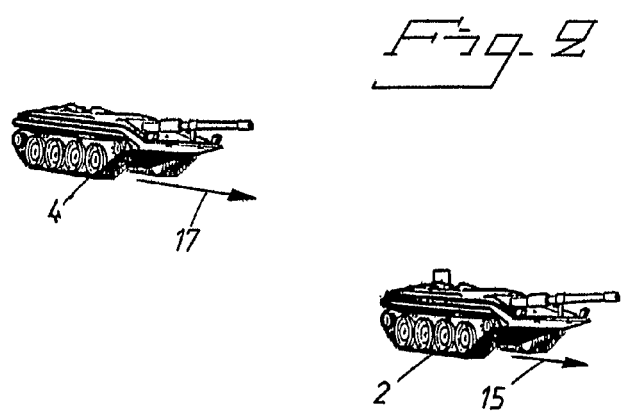
FIG. 2 shows, by means of speed vectors, an example of how units comprised in the first example can move.
Figure 2:

The units 2-5 are all of the mobile type and FIG. 2 shows, by means of speed vectors 15-18 for a specific point in time, in which direction and at what speed the different units are moving, and, by means of the starting points of the speed vectors, the calculated positions of the comprised units.

Figure 3:
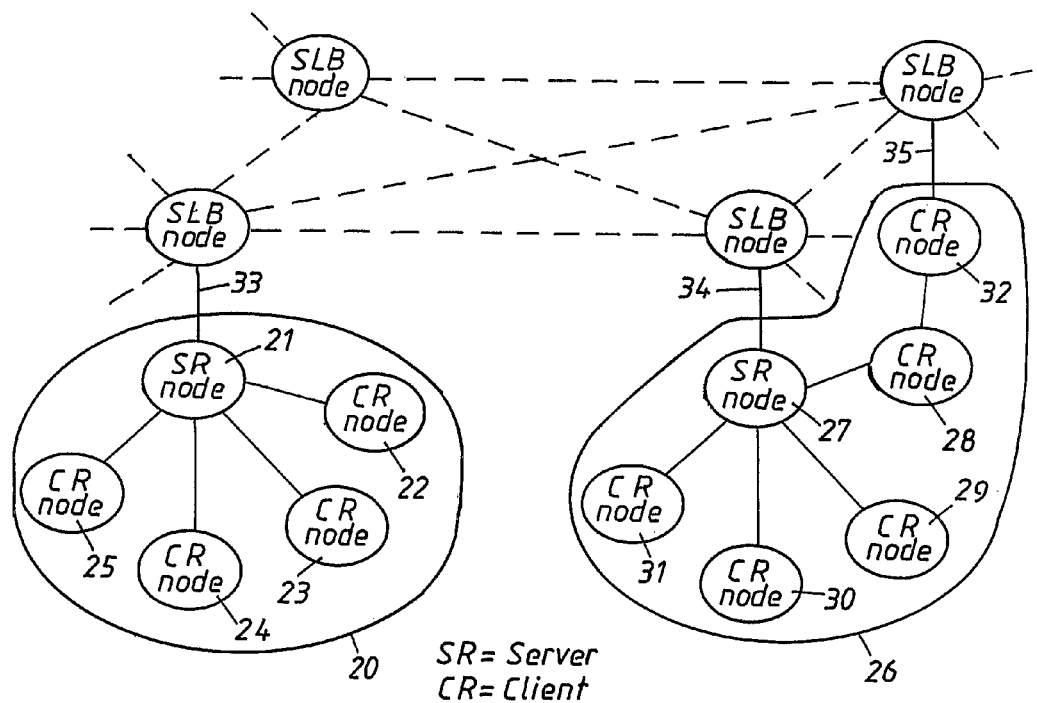
FIG. 3 shows an example of how a network according to the invention can be comprised in a larger communication system with higher-level decision-making.

FIG. 3 shows an example of a larger network comprising cluster-based networks according to the invention as subordinate networks. A first cluster 20 comprises a central unit 21 and four client units 22-25. A second cluster 26 comprises a central unit 27 and five client units 28-32. The client unit 32 communicates with the central unit 27 via the client unit 28. The central units and a client unit 32 are in contact with a higher-level network via data buses 33-35.

Figure 4:
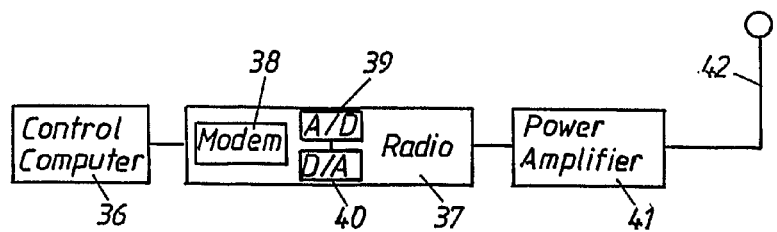
FIG. 4 shows an example of the construction of a unit comprised in the network according to the invention.

FIG. 4 shows the construction of a unit comprised in the network. The unit comprises a control computer 36, a radio module 37 with modem 38, A/D-converter 39 and D/A-converter 40, amplifier 41 and antenna 42. The radio module is preferably designed to be software-based.

Figure 5:
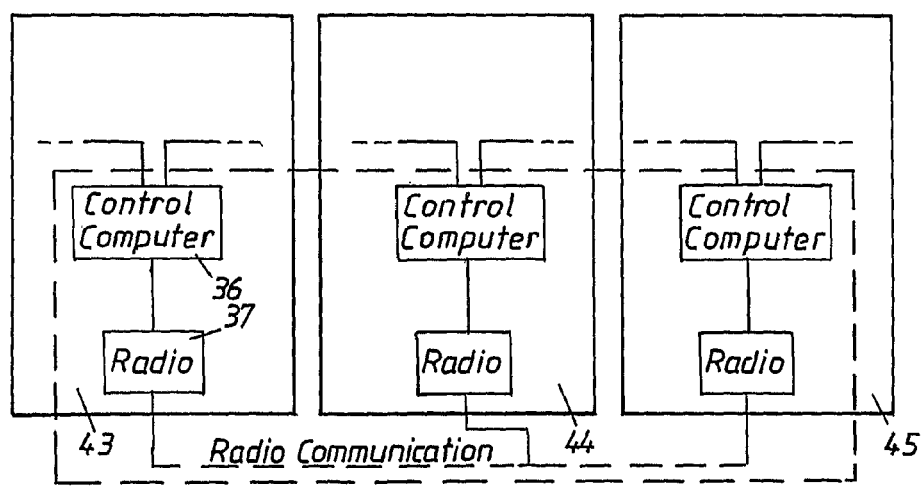
FIG. 5 shows an example of a network according to the invention with a central unit and two client units.

FIG. 5 shows three units according to FIG. 4 comprised in a network. The first unit 43 is given the function of central unit, while the other two units 44 and 45 are client units.

The network is suitably designed to be a multi-channel network with bi-directional communication. TDMA (Time Division Multiple Access) and TDD (Time Division Duplex) can be used for the communication. Resistance to interference is obtained by changing frequency often (FHSS—Frequency Hopping Spread Spectrum). Code keys are exchanged so that the recipients know the hop order. Routing tables are created so that it is possible to keep track of which units are to be included in the linking of data in a cluster.

In this connection, it can be noted that the radio communication can be used for other purposes than just for combat control. The communication can consist of pure information channels, such as, for example, an IK-network for quickly providing information concerning a target's IK-identity, a network for the transmission of tactical information of high priority or for the transmission of redundancy or complements to higher-level combat control.

The invention claimed is:

1. Network for combat control of ground-based units in real time, the network comprising:
   a plurality of ground-based units, wherein the units are divided into clusters, with a central unit in each cluster and at least one client unit in each cluster that is arranged to communicate with the associated central unit;
   wherein each unit comprises a control computer, radio, amplifier and antenna for communication with other units, wherein the radio of each unit includes a clock, and wherein the clock of each client unit of a particular cluster is synchronized with the clock of the central unit of the particular cluster; and
   wherein the central unit of a particular cluster is arranged to control units of the particular cluster on the basis of the threat evaluation and response calculation carried out in the central unit on the basis of information communicated from other units, said information comprising information about the current position, speed, orientation and status of the respective units, and on the basis of information produced by equipment of the central unit.

2. Network for combat control according to claim 1, characterized in that the communication between the units is carried out by wireless means.

3. Network according to claim 2, characterized in that a unit that intends to transmit predicts the delay in the transmission to the other unit.

4. Network according to claim 2, characterized in that the central unit and the other units in an associated duster are arranged to communicate bi-directionally and via several channels.

5. Network according to claim 2, characterized in that the central unit and the other units are arranged to communicate utilizing frequency hopping.

6. Network according to claim 2, characterized in that the central unit comprised in a duster comprises a dedicated gun platform.

7. Network according to claim 1, characterized in that the clocks of the client units of a particular cluster are synchronized with the central unit of the particular cluster by communication between the central unit and the client units within the particular cluster.

8. Network according to claim 7, characterized in that a unit that intends to transmit predicts the delay in the transmission to the other unit.

9. Network according to claim 7, characterized in that the central unit and the other units in an associated cluster are arranged to communicate bi-directionally and via several channels.

10. Network according to claim 1, characterized in that the clocks are synchronized to GPS-time.

11. Network according to claim 10, characterized in that a unit that intends to transmit predicts the delay in the transmission to the other unit.

12. Network according to claim 10, characterized in that the central unit and the other units in an associated cluster are arranged to communicate bi-directionally and via several channels.

13. Network according to claim 1, characterized in that a unit that intends to transmit predicts the delay in the transmission to the other unit.

14. Network according to claim 13, characterized in that the central unit and the other units in an associated duster are arranged to communicate bi-directionally and via several channels.

15. Network according to claim 1, characterized in that the central unit and the other units in an associated cluster are arranged to communicate bi-directionally and via several channels.

16. Network according to claim 1, characterized in that the central unit and the other units are arranged to communicate utilizing frequency hopping.

17. Network according to claim 1, characterized in that the central unit comprised in a cluster comprises a dedicated gun platform.

18. Network according to claim 1, wherein the central unit further comprises at least one sensor arranged to produce information for use in threat evaluation and response calculation.

19. Network according to claim 18, wherein the at least one sensor includes at least one active sensor.

20. Network according to claim 18, wherein the at least one sensor includes at least one passive sensor.

* * * * *